June 9, 1959  W. ROBBINS ET AL  2,890,034
STEERING-BY-DRIVING CONTROL MECHANISM
Filed Aug. 7, 1957  3 Sheets-Sheet 1

United States Patent Office 2,890,034
Patented June 9, 1959

2,890,034

STEERING-BY-DRIVING CONTROL MECHANISM

Wilbur Robbins and Clifford C. Conway, Nashville, Ill., assignors to National Mine Service Company, Pittsburgh, Pa., a corporation of West Virginia Application August 7, 1957, Serial No. 676,874

11 Claims. (Cl. 262—7)

This invention relates to steering-by-driving control mechanisms for self-transporting machines, such as endless-track mining machines, bulldozers, power shovels, military tanks and the like.

Among the several objects of the invention may be noted the provision of a hydraulic driving and steering mechanism of the class described obtaining a positive type of steering for forcibly and controllably maneuvering against, into, or through obstructions; the provision of such apparatus which will accommodate a more flexible, although nonpositive, type of steering for general unobstructed maneuvering in open space; the provision of apparatus of the class described which, particularly in its installation in mining machines, will not require space ordinarily occupied by other essential parts of the machines, such as material-carrying conveyors and the like; and the provision of apparatus of this class which is relatively simple, rugged, and reliable and which may conveniently be built into existing self-transporting apparatus. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a schematic side elevation of parts of a mining machine of the class to which the invention is applicable;

Corresponding reference characters indicate corresponding parts throughout the several views of the drawings.

Figure 1:
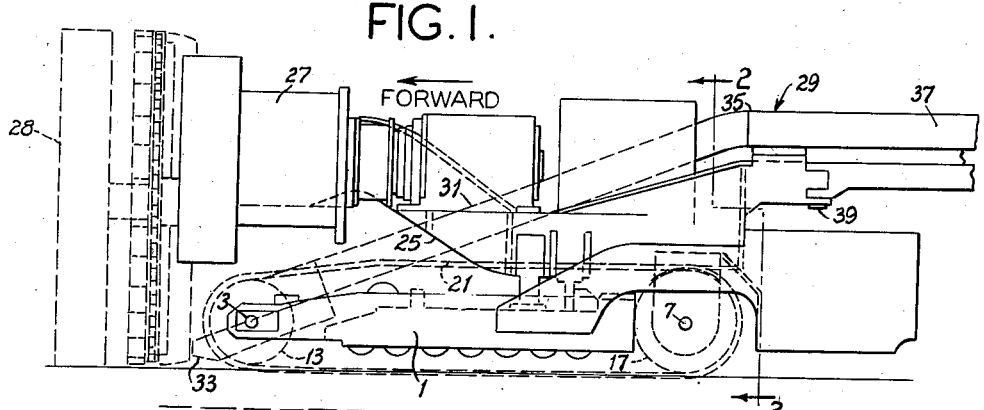
Figure 2:
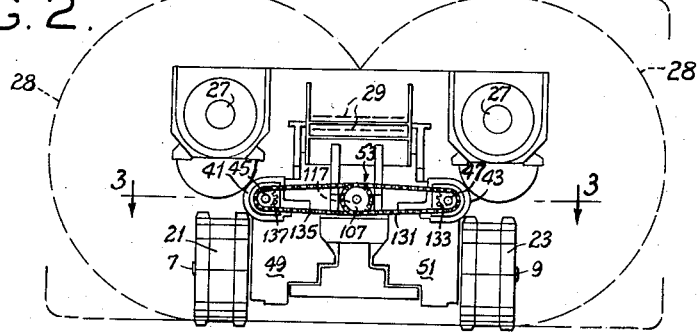
Fig. 2 is a schematic cross section taken on line 2—2 of Fig. 1.
Figure 3:
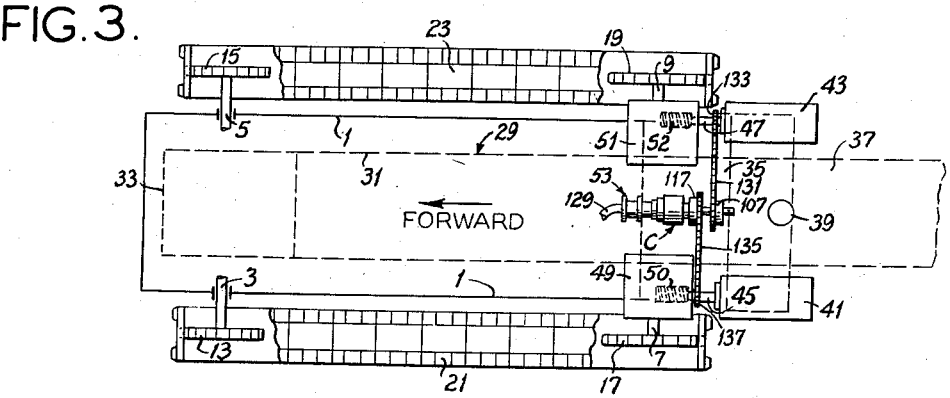
Fig. 3 is a fragmentary layout illustrating certain mechanical interconnections between hydraulic driving motors and endless tracks, being viewed generally on line 3—3 of Fig. 2.

While the invention has general application to self-transporting machines, the following description will for example be made in terms of application of the invention to a mining machine which is self-transportable on endless tracks. Referring to Figs. 1, 2 and 3, the pertinent parts of such a machine are shown.

Numeral 1 indicates a bed frame supported upon axles 3, 5, 7 and 9, respectively (see also Fig. 3). Axles 3 and 5 are front idling axles on which are sprockets 13 and 15. Live axles 7 and 9 carry driving sprockets 17 and 19. Endless tracks 21 and 23 connect the sprockets 13, 17 and 15, 19, respectively. As is known, steering of endless-track vehicles of the type under discussion is accomplished by varying the driving rate of the respective tracks such as 21 and 23. In the case of a mining machine, the bed frame 1 supports an adjustable frame 25 which, among other things, includes a drive 27 for forward cutting mechanisms indicated diagrammatically by dotted lines 28, and a materials conveyor 29 having a sloping portion 31 extending from a low point 33 just behind the cutting mechanism to a high point 35 somewhat above the rear axles 7 and 9. The conveyor has an extension 37 swiveled at 39 to the frame 25 for carrying the material off to the rear of the machine.

The above arrangement, which is the general one, allows little space between the endless tracks 21 and 23 for carrying any usual centrally located prime mover with clutching and declutching transmissions to the live axles 7 and 9. As a result, it has been the practice to employ fluid driving motors supplied from a power-driven pump for independently controllably driving the rear axles. This provided greater flexibility in positioning hydraulically connected pumps and motors, which is not true of prime movers and their transmissions. However, the employment of separate fluid driving motors for independent live axles, while providing for fairly satisfactory steerage in unobstructed spaces, is not a satisfactory arrangement for control when maneuvering against obstructions. For example, in the case of a mining machine, if a cutting mechanism such as 28 is driven at an angle against a facing, or driven straight through a non-homogeneous facing in which one side offers more resistance than the other, the machine will tend to turn with a high-resistance region on one side of the machine functioning more or less as a pivot. This tends to throw the machine out of its intended alignment while cutting. Such misalignment is undesirable, since it takes the steerage of the machine out of the control of the operator. The reason for it is that when two hydraulic motors are supplied with liquid under pressure from a common source and the driving member of one meets with a higher resistance than that of the other, the latter will accept the greatest volume of fluid, thus tending to drive its low-resistance track faster than the high-resistance track driven by the other motor. While attempts have been made to correct this, a condition of positive steering control has not been achieved, which the present invention supplies.

Referring again to the drawings, numerals 41 and 43 indicate respectively left-hand and right-hand hydraulic motors, the power shafts 45 and 47 of which are respectively connected into geared speed-reduction units or transmissions 49 and 51 located on frame 1 between the live axles 7 and 9, respectively. The gear trains in the boxes 49 and 51 on their motor sides start with worms 50 and 52 on the shafts of motors 41 and 43, respectively. The remainder of the gear trains in the transmissions are not illustrated, since any suitable ones may be connected between the worm 50 and axle 7 or worm 52 and axle 9, as the case may be.

At numeral 53 is illustrated a combined clutch and brake mechanism for controlling the action of the fluid motors 41 and 43. This is shown in more detail in Fig. 4, wherein 55 indicates a stationary housing supported on a part of the frame 1, the housing containing a cylinder 57 in which is a slidable hydraulic piston 59 connected to a plunger 61, both of which are biased by means of a spring 63 into a retracted position of the plunger. A fluid inlet is shown at 129. Application of hydraulic pressure into space 65 forces the piston 59 outward, compressing return spring 63. Plunger 61 engages with a crossbar 67 on the ends of which are plungers 69, engaging a collar 71 in which is an anti-friction bearing 73.

The inner race of the bearing is carried upon a nosepiece 75 of a clutch housing 77, the latter being axially slidable on a bearing 79 carried on the stub end 81 of a shaft 83. The stub end 81 is supported at one end in a pilot bearing 85 in the frame 1. The other end of the shaft 83 is carried in a bearing 87, the outer race of which is carried on part of the frame 1. Splined at 89 to the shaft 83 is a clutch pressure plate 91, which is axially slidable with respect to the clutch housing 77 but is prevented from rotating relatively thereto by means of pins such as shown at 93. These extend through openings such as shown at 95 in the housing 77. Springs such as shown at 97 react from adjustable backing pieces 99 located in openings 101 in the housing 77. These backing pieces are carried on a ring 103 which may be adjusted in position by a ring 105, threaded to the housing 77. The shaft 83 has affixed thereto a sprocket 107 and a brake drum 109. A brake band for the drum 109 is shown at 111.

At 113 is shown a quill surrounding shaft 83, being carried on the bearing 115. Attached to this quill is a sprocket 117 and a brake drum 119. The brake band for the latter is indicated at 121. Splined to the quill 113 (see spline 123) is a set of clutch discs 125. These are interleaved with clutch discs 127, which are marginally notched to form splines with the splining pins 93. Thus the discs 127 rotate with the shaft 83, while discs 125 rotate with the quill 113.

It will be understood that although only one each of parts 93, 97, 99 and 123 are shown, multiples of each of these are used, but all do not appear, since only one each is in the plane of the drawing section.

In the absence of any hydraulic pressure in the space 65, the clutch springs 97, by moving the housing 77 axially with respect to the pressure plate 91 (or vice versa), squeeze the discs 125 and 127 together, thus to close the clutch and synchronize the rotation of the sprockets 107 and 117. When hydraulic pressure is introduced into the space 65 over line 129, the clutch is opened against reaction from its springs 97, thus freeing the sprockets 107 and 117 for independent rotation. When the sprockets 107 and 117 are freed, they may respectively be braked by application of the brake bands 111 or 121.

Figure 4:
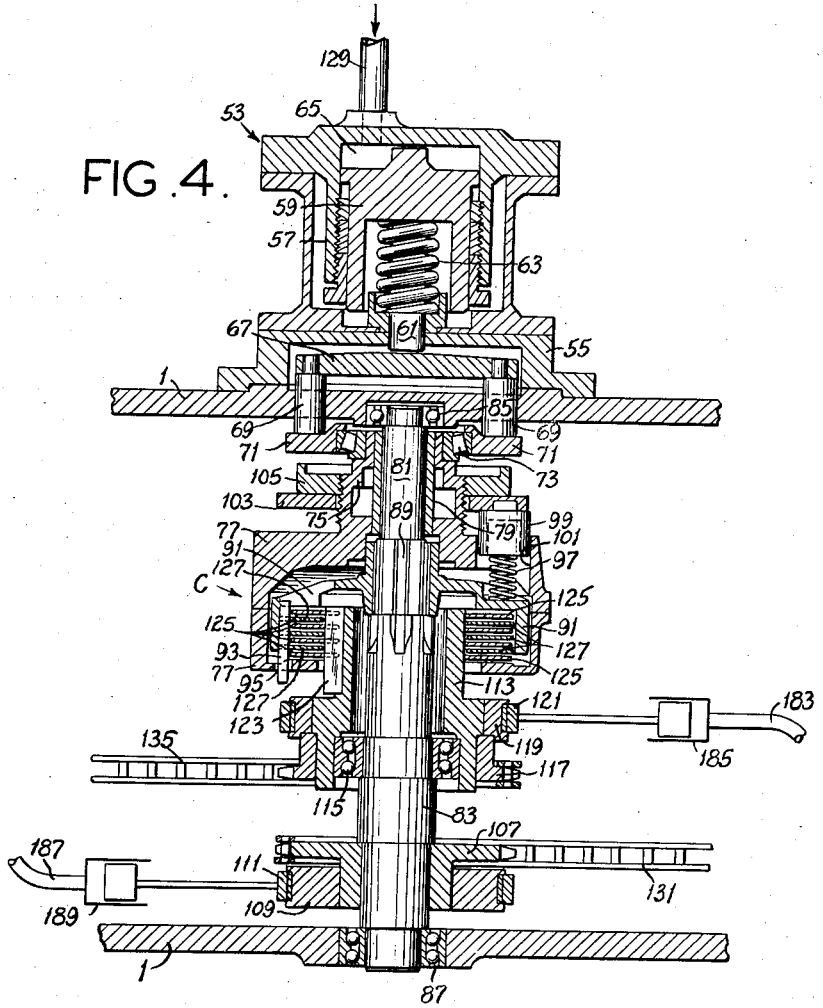
Fig. 4 is an enlarged horizontal section of the clutch and brake assembly which is in line 3—3 of Fig. 2; and, Fig. 5 is a schematic layout of a hydraulic circuit and other parts of the invention.

As shown in Figs. 3 and 4, a chain drive 131 connects sprocket 107 with a sprocket 133 on shaft 47 of hydraulic motor 43. A chain drive 135 connects sprockets 117 with a sprocket 137 of shaft 45 of hydraulic motor 41. The sprocket ratios of the respective chain drives 131 and 135 are the same. When the clutch of 53 (hereinafter referred to generally by letter C) is opened, the motors 41 and 43 may rotate independently. They may also be individually braked by brakes 119 or 109. When the brakes are off and the clutch is closed, the motors 41 and 43 are interlocked mechanically and synchronized.

An advantage of organizing the clutch and brake means as a unit, as shown in Fig. 4, is that this unit may be prefabricated and readily set into a convenient position on the frame 1. A convenient position in the case of a mining machine is on the frame between the fluid motors 41 and 43 and under the conveyor 31, 35, 37.

Figure 5:
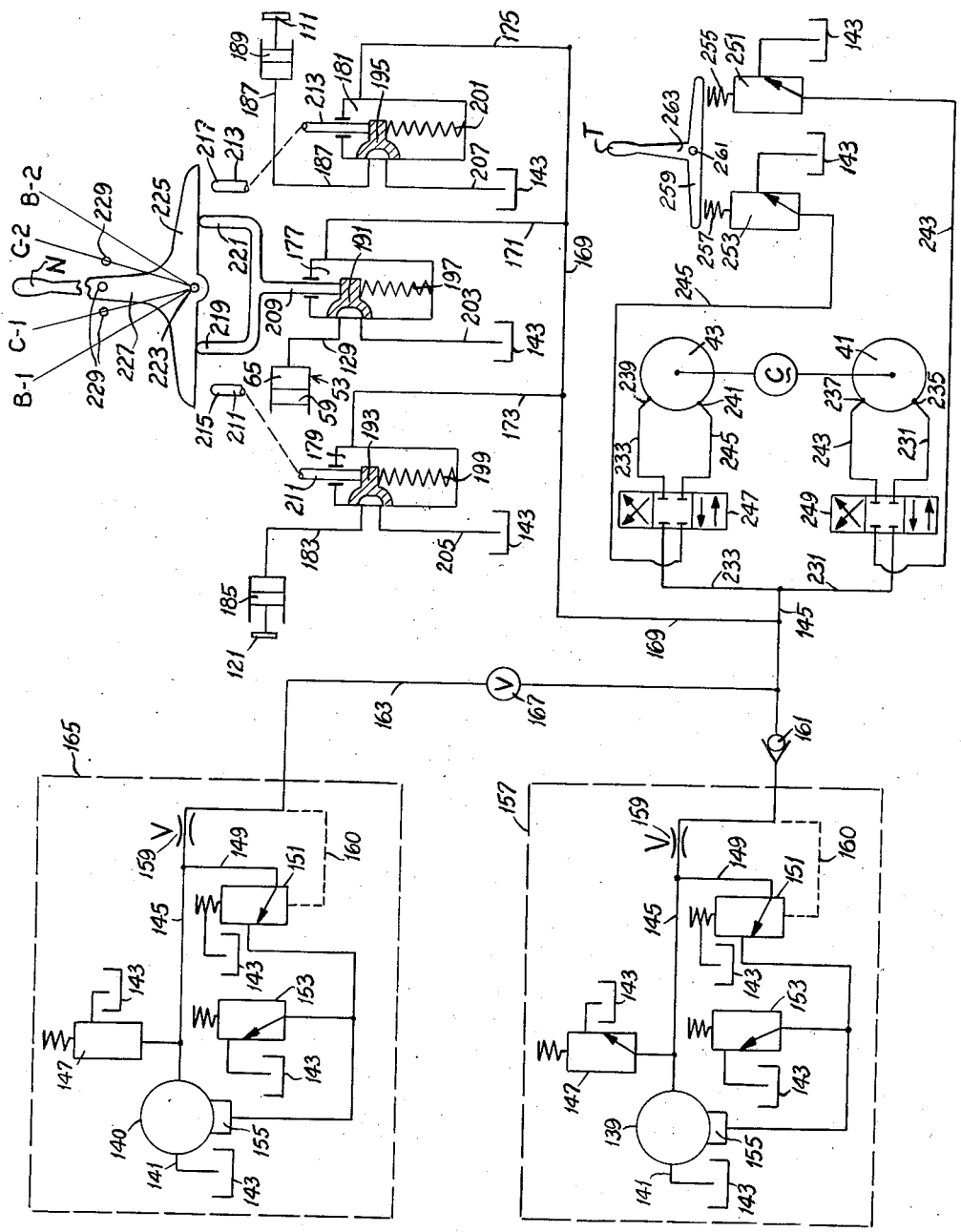

In Fig. 5 is shown diagrammatically a typical circuit. This connects the parts thus far described with a motor-driven positive-displacement pump 139 which is of the constant-pressure, variable-volume type, having for example a rating of 10 g.p.m. The pump 139 has a suction line 141 from a sump 143 and also has a delivery line 145. Associated with the latter is the usual safety relief valve 147 and a line 149 in which are a sequence valve 151 and a secondary relief valve 153. At 159 is illustrated a conventional variable orifice valve and at 160 a remote control line between the downstream side of valve 159 and sequence valve 151. The valve 159 is an output volume regulator for controlling the speeds of the hydraulic motors 41 and 43. These parts are conventional and, in connection with a stroke control device 155 on the pump 139, serve to make the output of the pump of variable-volume, constant-pressure character. Hereafter the assembly of parts within the dotted rectangle 157 will be referred to as a hydraulic pressure source of variable volume and constant pressure.

The variable orifice valve is for artificially loading the pump when the hydraulic circuit beyond the orifice is working under low loads. At 161 is shown an outlet check valve beyond which is an inlet supply line 163 leading from another positive-displacement, variable-volume, constant-pressure source 165 in which are parts the same as in the source 157 and correspondingly indexed, except that the pump therein, which has a greater capacity such as, for example, 40 g.p.m., is indexed 140. A cutoff valve 167 in line 163 may be opened whenever extra volume of hydraulic fluid is required in the line 145 to speed up functions to be described. Normally the valve 167 is closed for normal speed operations.

Beyond the connection 163 in line 145 is another connection 169 which has three branches 171, 173 and 175 leading to three similar control valves 177, 179 and 181, respectively. The outlet of valve 177 is constituted by said connection 129 passing to the space 65 in the clutch mechanism 53 (see Fig. 4). An outlet 183 of valve 179 connects with conventional hydraulic operating mechanism 185 for applying brake band 121. Outlet 187 of valve 181 connects with conventional operating mechanism 189 for brake band 111. Operating gates of the valves 177, 179 and 181 are shown at 191, 193 and 195, respectively, these being biased to the cutoff positions shown, by springs 197, 199 and 201, respectively (Fig. 5).

The lines 129, 183 and 187 are adapted to drain back to the sump 143 via return lines 203, 205 and 207, respectively. Operating members 191, 193 and 195 carry stems 209, 211 and 213, respectively, to provide external control means for biasing the gates against their return springs, so that the inlets of the respective valves may be connected with their outlets. Stems 211 and 213 carry operating ends 215 and 217, respectively. The stem 209 is branched so as to carry two operating ends 219 and 221.

Pivoted at 223 is a rocker bar 225, having an operating handle or lever 227, a neutral position of which is shown at N. By rocking the bar 225 from handle 227 a few degrees to either of two first positions, C-1 or C-2, the valve 177 may be set to open position to supply pressure to the clutch, thereby to open it. Either of these intermediate control positions C-1 or C-2 may be maintained by a conventional detaining lock arrangement (not shown in detail but indicated by the three circles 229 on Fig. 5).

The handle 227 also has two additional control positions B-1 and B-2 at greater angles from the neutral position N. When either of these is reached, valve 179 will open to apply brake band 121, or valve 181 will open to apply brake band 111. In either case the clutch 53 will be released. When the handle 227 is centered at N, all of the lines 129, 183 and 187 will drain to the sump 143, thus closing clutch C and releasing both brake bands 111, 121 in 53.

Beyond the connecting line 169, the pressure line 145 leads to branch connections 231 and 233 with the hydraulic motors 41 and 43. Each of these motors is reversible. Motor 41 has ports 235 and 237 and motor 43 has ports 239 and 241. These ports are inlets or outlets alternatively, depending upon which connection receives fluid under pressure. As shown, branches 231 and 233 are connected to ports 235 and 239, respectively. Additional lines 243 and 245 are connected to ports 237 and 241, respectively. The lines 233 and 245 pass through a conventional four-way valve 247 which has opposite positions for applying pressure to either port 239 or 241 of motor 43 while providing an outlet from the other port of the pair. Valve 247 also has a center position in which neither port 239 or 241 is connected and in which pressure passes through the valve from line 233 to 245 without reaching the motor 43.

The lines 231 and 243 pass through a conventional four-way valve 249 which also has opposite positions for applying pressure to either port 235 or 237 of motor 41 while draining from the other port of the pair. Valve 249 also has a center position in which neither port 235 or 237 is connected and in which pressure passes through the valve from line 231 to 243 without reaching the motor 41.

In lines 243 and 245, respectively, are valves 251 and 253 of the conventional variable spring-loaded outlet check type. Their outlets drain to the sump 143. The loading springs of valves 251 and 253 are shown at 255 and 257, respectively. A rocker bar 259, pivoted at 261 and having a control handle or lever 263, may be rocked from a neutral position T to apply added pressure to one or the other of the springs 255 or 257, thus to increase the back pressure in either of lines 243 or 245, respectively. Hence when lever 227 is locked into either of its C–1 or C–2 positions, wherein the motors 41 and 43 are declutched but the brakes 111 and 121 not applied, the lever 263 may be used as a steering lever by changing the back pressure on one or the other of the lines 243 or 245 and thereby decreasing the speed of the motor to which the back pressure is applied. Thus if lever 263 is set into position to operate on valve 253 and increase the back pressure on line 245, the motor 43 will slow down and reject fluid. Motor 41 will then increase in speed. As a result, the machine will turn to the right if motor 41 is the left-hand motor. On the other hand, if lever 263 is set into position to operate on valve 251, the back pressure on line 243 will increase. The left-hand motor 41 will reject fluid and slow down. Right-hand motor 43 will increase in speed, thus turning the machine to the left.

It will be apparent that the valves 247 and 249 may both be equally set for both motors 41 and 43 driving ahead or rearward; or these valves may be oppositely set for the motors operating in opposite directions. In the latter event the machine may be turned on a vertical axis between endless tracks 21 and 23 without using either of the steering valves 251 or 253. In this event, lever 227 is assumed to be in one of the positions C–1 or C–2. Both valves 247 and 249 may also be set to neutral positions in which no fluid under pressure reaches the motors 41, 43. In this case the machine is stationary.

When both the valves 247 and 249 are equally set for either forward or reverse action, both motors 41 and 43 drive in the same direction, the steering valves 251 and 253 being operated for steering purposes when maneuvering in open spaces. This mode of steering is sufficient and sometimes preferable in maneuvering a mining machine in an open space, such as through open passages and open crosscuts in mines, but may be insufficient in maneuvering it while its cutters 28 are in action against a mine face, for example. If the material on one side of the machine is harder than on the other, or the cutters are angling into a face, the endless track on the high-resistance side of the machine will apply more resistance to the driving motor on its side. This motor will then reject fluid and the opposite motor will receive more hydraulic fluid. This is undesirable, because it prevents proceeding in a predetermined line through facing. Moreover, any unexpected turning of the machine is dangerous.

When the machine is working against resistance, such as above described, steering is accomplished by setting the lever 263 at neutral position T, whereupon valves 251 and 253 exert equal back pressures on the outlets of the motors 41 and 43. Both valves 247 and 249 are set for forward movements of both motors 41 and 43. Lever 227 is then used for control. If it is desired to drive straight forward against resistance, the lever 227 is left on center, meaning that motors 41 and 43 have their brakes 121 and 111 released while the clutch C synchronizes them. Under these conditions, assume that the right-hand forward side of the machine meets with increased resistance. This will not result in any tendency of the left-hand endless track 21 to speed up because both motors, being positively mechanically coupled, must turn at the same speed. Under such condition their volumetric displacements are the same. Consequently, each must accept the same amount of fluid as the other. In other words, the flow from line 145 is divided and supplies both motors 41 and 43 equally. The machine will then drive straight forward, regardless of any variable resistance applied to one side or the other from its front end. The result is the ability to drive through material being mined, in a straight line.

On the other hand, there may be circumstances in which it is desirable to exert a turning movement while cutting against or through a face, whether or not variable resistance is met across the front of the machine. In such event, the lever 227 is set to either the extreme B–1 or B–2 position (lever 263 at neutral position T), in which case a declutched condition is effected between motors 41 and 43 but the brake of one or the other is selectively set. In such event, the motor on the braked side of the machine substantially stops and hydraulic fluid which it would otherwise receive passes to the other motor. This rejected fluid which passes to the other motor speeds it up to swing the machine to pivot around its braked side, even though the mine-face resistance met with on the nonbraked side of the machine is higher than on the braked side. The resulting turning action, unlike that obtained by operation of the valves 251 and 253, is positive, so that the machine (in the case of a miner) can be accurately maneuvered while exerting heavy cutting pressure. The positiveness of this steering action arises from its being accomplished by lateral braking, as distinguished from control of outlet pressures of motors 41 and 43. It will be understood that the braked motor 41 or 43 need not stop entirely but may simply be slowed down in order to obtain the positive steering effect against resistance.

The described positive maneuverability under high thrust cutting conditions is not possible simply by changing back pressures as by means of valves 251 and 253. Nevertheless, steering by varying the back pressures on the motors 41 and 43 through valves 251 and 253 is preferred for maneuvering in open spaces where there is no heavy reactive thrust due to cutting action or the like. In such case, the lever 227 is locked in either of the C–1 or C–2 positions to declutch the motors 41 or 43, and lever 263 is swung to one position or another to vary the back pressure on either motor through valves 251 and 253. And from the above it is to be understood that when lever 227 is in the locked position C–1 or C–2, and lever 253 left in neutral position, wherein valves 251 and 253 present equal back pressures, the machine may be turned around on an axis between the endless tracks 21 and 23 by setting the valves 247 and 249 to opposite positions in which the motors 41 and 43 rotate in opposite directions. Under these conditions, one endless track 21 or 23 moves in one direction and the other in the opposite direction.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A driving and steering mechanism for machines having right and left endless transport tracks; individual hydraulic driving motors, transmission means connecting each driving motor with one track, a power-driven pump means adapted to supply both motors with hydraulic fluid, a hydraulic circuit connecting said pump means through branches supplying said motors, said motors having individual hydraulic outlets, an adjustable back pressure relief valve connected in each outlet, first control means operative from a neutral position on said adjustable pressure valves alternately to vary the respective back pressures from said outlets, whereby the motor speeds may be varied relatively for steering purposes, individual releasable brakes for the motors, clutch means having rotary elements adapted to be connected and disconnected, a drive connection between each one of said motors and one of said rotary elements, a second control means for the clutch and brakes adapted when set in a neutral position to engage the clutch while releasing the brakes and when set into either of two first alternate positions to release the clutch and to apply one brake, said second control means having two additional and alternate intermediate positions in either of which said clutch and the brakes are released, whereby said first-named control means may be employed for steering when said second control means is in either of said intermediate positions, and whereby steering may be effected from said second-named control means by movement to either of its first alternative positions when the first control means is in neutral position.

2. A driving and steering control for a mining machine having lateral endless tracks on each side of a frame which carries forward cutters and a longitudinally positoned conveyor leading from the cutters rearward over the frame; comprising individual transversely located rotary hydraulic motors carried upon said frame, individual transversely located transmissions connecting the respective motors with respective transverse endless tracks, an assembly of coaxial relatively rotary members, a normally closed clutch connecting said relatively rotary members, individual brakes each of which includes a rotary friction member on one of the rotary members, said rotary members, clutch and brakes being located upon the frame between the motors and below the conveyor, a mechanical drive connecting each motor with one of said rotary members, and control means adapted in each of two alternative positions to open the clutch and alternatively apply the respective brakes.

3. A driving and steering control made according to claim 2, wherein the axes of the rotary motors and of said rotary members of the clutch are parallel and extend parallel to said tracks, and wherein said mechanical drives are constituted by sprockets and chains extending transversely to said axes.

4. A driving and steering control made according to claim 2, wherein said hydraulic motors have drive shafts which are located lengthwise of the machine, said drive shafts respectively carrying worms which are the first gears in the respective transmissions, and wherein chain drives connect the hydraulic motor shafts with the coaxial relatively rotary clutch members respectively said chain drives having reaches extending below said conveyor.

5. A driving and steering mechanism for machines having right and left endless transport tracks, individual reversible hydraulic driving motors, transmission means connecting each driving motor with one track, a hydraulic pressure source adapted to supply both motors with hydraulic fluid, a hydraulic circuit having branches containing reversible connections between said source with said motors respectively, said motors having ports adapted for alternate use as inlets and outlets according to said connections, control valves in the branches of said circuit for the respective motors adapted to control the reversible connections in said branches of the circuit to supply fluid to the motors for simultaneous forward or reverse movements and for alternate forward and reverse movements, adjustable back pressure relief valves connected to the motors respectively to receive fluid from whatever port functions as an outlet in accordance with said connections, first control means operative from a neutral position on said adjustable pressure valves alternately to vary the respective back pressures from said outlets, whereby the motor speeds may be varied relatively for steering purposes, individual releasable brakes for the motors, clutch means having rotary elements adapted to be connected and disconnected, a drive connection between each of said motors and one of said rotary elements, a second control means for the clutch and brakes adapted when set into neutral position to engage the clutch while releasing the brakes and when set into either of two first alternate positions to release the clutch and apply one brake, said control means having two additional and alternate intermediate positions in either of which said clutch and the brakes are released, whereby said first-named control means may be employed for steering when said second control means is in either of said intermediate positions, and whereby steering may be effected from said second control means by movement to either of its first alternative positions when the first control means is in neutral position.

6. A driving and steering control mechanism for self-transporting machines having transversely opposite driving means; comprising individual hydraulic motors, a power transmission between each hydraulic motor and one driving means, individual releasable brakes for the hydraulic motors, clutch means having rotary elements adapted to be connected and disconnected, a drive connection between each one of the motors and one of said rotary elements, and control means for the clutch and the brakes adapted to be manipulated to engage the clutch and release the brakes or to release the clutch and apply one brake.

7. A driving and steering control mechanism according to claim 6, wherein said control means is adapted also to be manipulated to release the clutch without application of either brake.

8. A driving and steering control mechanism for self-transporting machines having transversely opposite driving means; comprising individual hydraulic motors, a power transmission between each motor and one driving means, a common hydraulic pressure source having branched hydraulic fluid connections to both motors, individual hydraulic brakes for the motors, clutch means having rotary elements adapted to be connected and disconnected, a positive mechanical drive connection between the motors and the rotary elements respectively, hydraulic control means for the clutch and the brakes adapted when set at one control position to engage the clutch and release the brakes and when set at either of two alternate control positions to release the clutch and apply one brake.

9. A driving and steering control mechanism according to claim 8, wherein said control means is adapted to pass through or to be set at a third position wherein the clutch is released and neither of said brakes is applied.

10. A driving and steering mechanism for machines having transversely opposite endless transport tracks; separate hydraulic driving motors each having fluid inlet and outlet means, a mechanical transmission connecting each driving motor with one track, a power-driven pump adapted through branched connections to supply both motors with hydraulic fluid, individual releasable hydraulically operated brakes for the motors, a hydraulically operated friction clutch means having rotary elements adapted to be connected and disconnected, a mechanical drive connection between the motors and the rotary elements respectively, and hydraulic control means for the clutch and brakes including valve means and a control member therefor adapted when set in one position to effect engagement of the clutch and when set into either of two alternate positions to effect release of the clutch and application of one brake.

11. A driving and steering mechanism according to claim 10, wherein said control means for the clutch is adapted when said control member is in either of two intermediate positions to release the clutch without application of either brake, and also including an outlet check valve in each motor outlet means adapted to increase its back pressure, and second control means adapted alternatively to operate said check valves, whereby auxiliary steering may be accomplished when the other control member is set at either of its said two intermediate positions.

References Cited in the file of this patent

UNITED STATES PATENTS

| | | |
|---|---|---|
| 1,677,878 | Leake | July 17, 1928 |
| 1,984,830 | Higley | Dec. 18, 1934 |
| 2,605,852 | Rhoads | Aug. 5, 1952 |
| 2,711,077 | Adams | June 21, 1955 |
| 2,715,527 | Cartlidge et al. | Aug. 16, 1955 |
| 2,745,503 | Fisher | May 15, 1956 |
| 2,771,958 | Ball | Nov. 27, 1956 |